United States Patent [19]

Kucera et al.

[11] Patent Number: 4,773,009
[45] Date of Patent: Sep. 20, 1988

[54] METHOD AND APPARATUS FOR TEXT ANALYSIS

[75] Inventors: Henry Kucera, Providence, R.I.; Rachael Sokolowski, Charlestown, Mass.; Jacqueline Russom, Providence, R.I.

[73] Assignee: Houghton Mifflin Company, Boston, Mass.

[21] Appl. No.: 872,094

[22] Filed: Jun. 6, 1986

[51] Int. Cl.$^4$ ............................................. G06F 15/40
[52] U.S. Cl. ..................................... 364/419; 400/63; 364/200; 364/900
[58] Field of Search ...................... 364/419, 900, 200; 340/39, 40; 400/63, 83

[56] References Cited

PUBLICATIONS

Holder, Wayne, "Software Tools for Writers", Byte, Jul. 1982, pp. 138-163.
Gunning, Robert, The Technique of Clear Writing; 1968, pp. 29-39.
"Computer-Aided Editing-Present and Future", J. Douglas Kniffin, Westinghouse Electric Corp.

Primary Examiner—Jerry Smith
Assistant Examiner—Gail O. Hayes
Attorney, Agent, or Firm—Lahive & Cockfield

[57] ABSTRACT

An electronic text analyzer operates on an ordered block of digitally coded text by analyzing sequential strings thereof to determine paragraph and sentence boundaries. Each string is broken down into component words. Possible abbreviations are identified and checked against a table of common abbreviations to identify abbreviations which cannot end a sentence. End punctuation and the following string are analyzed to identify the terminal word of a sentence. When sentence boundaries have been determined, the text may be further processed by a grammar checker, a readability analyzer, or other higher-level text processing system.

A preferred embodiment includes a readability analyzer having a syllable counter for determining the number of syllables in each word. The system includes a modified common-word table having an empirical syllable-count field. A checker first determines if a word is in the table and, if so, returns its syllable count. An exception table identifies words not conforming to a syllable counting algorithm. Each word not in the common-word or exception tables is modified, and the modified word is processed to derive its syllable count. In a preferred embodiment, tallies are kept of words per sentence, syllable count, sentences per paragraph, and similar data, and readability scores based on the tallies are displayed.

42 Claims, 4 Drawing Sheets

| FORMULA | MEASURES USED | | | | | |
|---|---|---|---|---|---|---|
| | WORDS | SENTENCES | SYLLABLES | LETTERS | COM. WORDS | THREE SYL. |
| ARI | X | X | | X | | |
| BORMUTH | X | X | | X | X | |
| COLEMAN-LIAU | X | X | | X | | |
| DALE-CHALL | X | X | | | X | |
| FLESCH | X | X | X | | | |
| FOG | X | X | | | | X |
| KINCAID | X | X | X | | | |

METHOD AND APPARATUS FOR TEXT ANALYSIS

TECHNICAL FIELD

The present invention relates to digital text processing equipment, such as the computer systems used for office word processing, or the generally more powerful systems used in the publishing industry for the composition and editing of text.

In recent years, such text editing systems have been provided with various subsystems for correcting, or for calling to the operator's attention, probable errors, at least in spelling. An automated text editing system would desirably identify a broad range of typographical, grammatical, and stylistic errors. To date, however, text editing systems cannot deal with certain editorial concerns such as stylistic traits related to complex grammatical structures or the meaning of words.

At the lower end of the existing spectrum of text editing capabilities, office word processing systems typically contain a "spelling checker." These typically operate by taking a block of digitally coded text, and looking up each word of the text in an electronic dictionary, or database, of commonly used words. Text words which are either not in the database or are spelled differently than database entries are displayed for the operator's attention. One or more words having similar spelling may be displayed on the screen for the operator to select the word which was intended. A spelling checker of this type serves primarily to correct data entry errors.

Another feature in some office systems is a structure which identifies multiple occurrences of a word in a coded text block, and displays the occurrences to the operator. Such a system may also use an electronic dictionary to display synonyms for the repeated word. This allows the operator to eliminate awkward repetitions from the text. This level of editing capability, like a spelling checker, requires only the comparison and identification of individual text words.

Not uncommonly, an office word processing system also includes one or more error recognition features, such as a subsystem for recognizing the probable omission of a period, or for detecting some other such error. Typically, the provision of such an error detector requires the implementation of a text processing algorithm for recognizing a particular word-sized pattern of coded data. For example, an occurrence such as an uppercase letter preceded by a lowercase letter and two blank spaces could be displayed to the operator as a possible intended sentence boundary with an omitted period. Again, editing capabilities of this type are directed primarily toward detecting data entry errors.

Finally, an editing capability has recently become available for operating on a block of coded text data and delivering an output which indicates the "readability" of the text. The readability is a measure of the style difficulty of text, and has been empirically associated in the literature with a great number of different readability formulae. Among the known formulae for readability in the literature are the FOG index which measures the proportion of words having greater than three syllables; several indices related to the proportion of words occurring on the Dale-Chall list of common English words; and several formulae based on functions of both sentence length in words, and word length in syllables or characters.

These formulae do not directly measure the meaning, content, organization, format, legibility, or other factors often considered important for the comprehension of the text. Instead, they conventionally rely on a number of objectively ascertainable measures, such as the length of sentences, the number of words per sentence, the number of syllables per word, and like measures.

While the objective nature of these readability formulae have made them useful tools for normative editing judgments, the basic data which must be counted or measured for their application - syllables, linguistic words, sentences, and paragraphs - are not as susceptible to automated determination as the text words used in the above-discussed editing systems.

Where sentence boundaries are simply declared to occur at each occurrence of a period, the automated recognition of sentence boundaries may result in a significant proportion of errors. Furthermore, a prior art text analyzer which determines syllable count simply by counting the occurrences of vowels in a word of text may also yield inaccurate results. Human beings learn to recognize separate sentences by the occurrence of a terminal punctuation together with certain key patterns or constructions in surrounding text and text layout, applied in light of their accumulated knowledge of exceptions, sentence structure and so forth. The analysis of syllable counts is, if anything, more difficult. A person essentially relies on having learned the normal pronunciation of a word to determine its syllable count.

Accordingly, it is desirable to provide a text editing system capable of accurately and reliably breaking down a block of digitally encoded text material into syllable, word and sentence information.

OBJECTS AND SUMMARY OF THE INVENTION

It is an object of the invention to provide an improved text editing system for determining paragraph boundaries in digitally encoded text.

It is another object of the invention to provide an improved text editing system for determining sentence boundaries in digitally encoded text.

It is another object of the invention to provide an improved text editing system for determining words in digitally encoded text.

It is another object of the invention to provide an improved text editor for determining syllable counts in digitally encoded text.

It is another object of the invention to provide an improved text editing system for producing an output indicative of the readability of digitally encoded text.

It is another object of the invention to provide a text editor which provides one or more of the aforesaid objects with enhanced speed or accuracy, while placing minimal requirements on the processing system for data storage and manipulation.

These and other objects of the invention are obtained in an electronic text analyzer having a sentence splitter which operates on digitally encoded text material by analyzing sequential segments thereof to determine paragraph and sentence boundaries. Possible abbreviations are identified and checked against an internally stored table of common abbreviations to identify obligatorily non-terminating abbreviations. When a word has certain end punctuation which may terminate a sentence, the following word is analyzed to determine if it is the first word of the next sentence. In this manner sentence boundaries are identified in the coded text. Text fragments are identified by a comparison of the sentence and paragraph boundaries. The system has features which can advantageously be employed to pre-process text for an automated punctuation or grammar analyzer.

In one embodiment, the text analyzer includes a readability analyzer. The number of words in each sentence is accumulated, and a syllable counter determines the number of syllables in each word. In a preferred embodiment, the system stores a modified Dale-Chall common word table having an empirical syllable count field. A word checker first determines if a word is in the table and, if so, notes its syllable count. The common word table may also contain, for each word which is an exception to a syllable count rule, a code indicating such exception. Each word not in the table is then modified, and characters in the modified word are counted to determine its syllable count. In a preferred embodiment tallies are kept of words per sentence, syllable count, sentences per paragraph, and similar data; and a readability measure based on the tallies is developed. In a further preferred embodiment the user selects one or more of several desired readability measures, and interpretive text is displayed with the output data.

BRIEF DESCRIPTION OF THE DRAWINGS

These and other features of the invention will be understood in relation to the description below with reference to the drawings, in which.

DETAILED DESCRIPTION OF ILLUSTRATED EMBODIMENT

Figure 1:
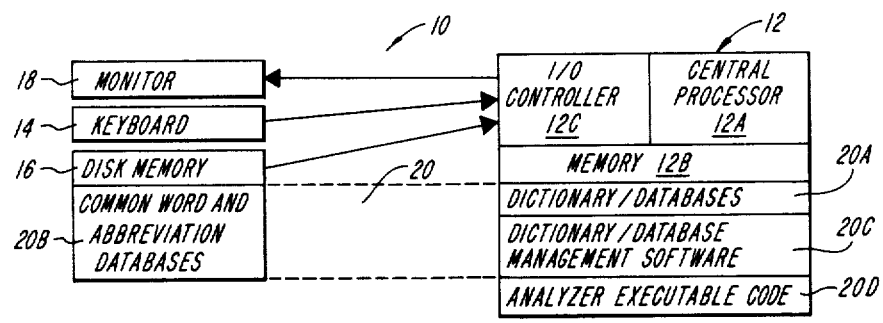
FIG. 1 shows a computer system for use in one practice of the invention.

FIG. 1 represents a computer system for the practice of the invention. The illustrated system 10 is a programmed digital computer 12 which includes a central processing unit 12A connected with a memory unit 12B and with an input/output control unit 12C. The computer 12 can be any of numerous commercially available programmable digital computers, such as IBM-PC.

The computer 12 is connected with a high speed non-volatile storage device, such as a disc memory 16, and is also connected with a display monitor 18 and a keyboard 14. The monitor and keyboard provide an interface between the system user and the computer. Specifically, the keyboard translates user-typed commands into computer-readable signals, and the monitor 18 displays graphic or alphanumeric information generated by the keyboard or processed by the computer.

The illustrated system 10 employs portions of various memory elements to store instructions for operating on coded data representative of text, and to store a database for processing the data to derive properties of the underlying text. The instruction set and necessary databases for performing the text analysis are provided to the system on a prerecorded magnetic disc. As discussed more fully below, the stored databases, or dictionaries 20B, include a common word table and an abbreviation table. This information is loaded into the processor from the disk. Alternatively it may be loaded through a data input line from a remote or central station. As indicated schematically in FIG. 1, the dictionary databases, and certain database management software for accessing and decoding the information stored in the databases, are stored in the active memory of the computer in portions 20A, 20C thereof, respectively. Also stored in portion 20D thereof is the executable code for operation of the text analyzer.

Figure 2:
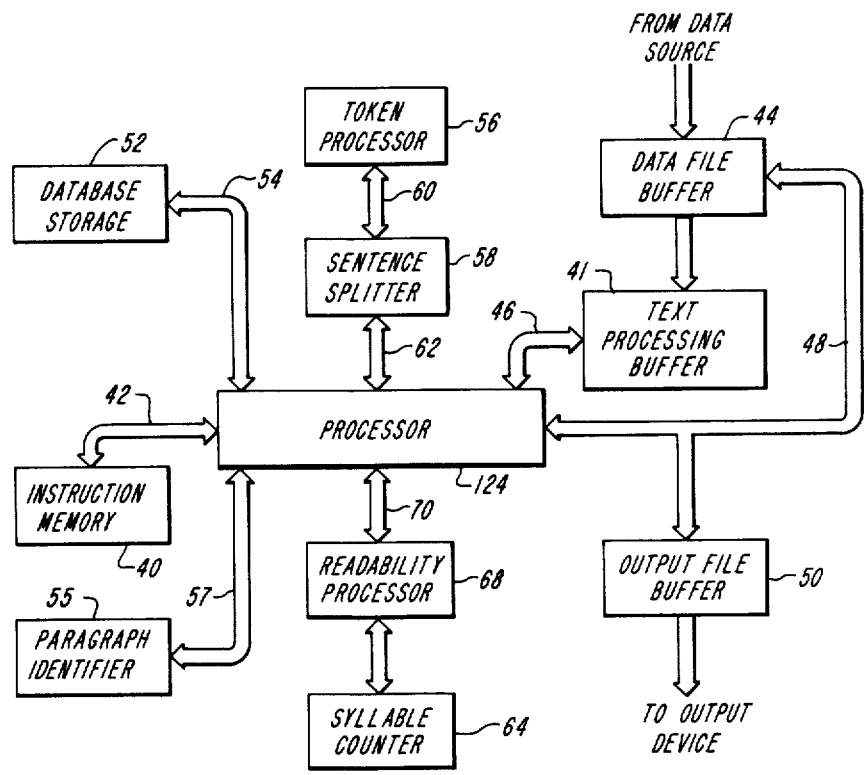
FIG. 2 shows various elements of the computer system shown in FIG. 1.

FIG. 2 shows the arrangement of various subcomponents of a text editing system 10 of FIG. 1. The computer memory includes an instruction memory 40 which stores instructions for controlling the system operation. This memory is in two-way communication over instruction bus 42 with the processor 12A. An input buffer 44 receives digitally encoded text information from the keyboard, disk or other source, and a text processing buffer 41 holds data from the input buffer 44 which has been or is being processed. In the illustrated embodiment input buffer 44 provides data to the processor along input bus 46 and text processing buffer 41 is in two-way communication with the processor 12A along processing bus 46. An output file buffer 50 provides system outputs to a printer, CRT display, or external storage or communication device. Schematically indicated in block form are a sentence splitter 58 and a readability processor 68, each of which receives inputs of text data and instructions through the processor 12A and provides outputs back to the processor of intermediate or fully processed data along corresponding data buses 62 or 70, respectively. Readability processor 68 controls a syllable counter 64 and communicates with the processor along bus 70 to develop basic word, sentence and syllable count data for a readability output.

A token processor section 56 controlled by the sentence splitter 58 receives a sequential string of consecutive coded characters from the input buffer, and fits the string into a data structure to produce "tokens" which correspond to linguistic words and punctuation of the encoded text.

The sentence splitter section 58 receives consecutive tokens derived from the coded text, subjects them to a punctuation stripping and processing protocol, and analyzes the occurrence of certain ordered sequences of letters, spaces, and punctuation to ascertain the occurrence of an end of sentence. The sentence splitter 58 provides an output back to the central processor 12A of coded information indicative of the byte count in the input buffer of the end of sentence, or of the token position.

Independently, a paragraph identifier 55 processes data from the coded text, communicating with processor 12A over line 57 to identify paragraph boundaries.

The syllable counter 64 is controlled by the readability processor 68, and operates on each word to derive a syllable count for the word. The syllable count information may update a counter or array used for holding statistics required by the readability processor.

The readability processor 68, also operates according to instructions provided by the central processor to gather text statistics and to develop and deliver readability output scores according to certain formulae. The readability output passes to the processor 12A along line 70, via line 48 to the output buffer 50 to be displayed, printed or otherwise delivered to an external device.

Figure 3:
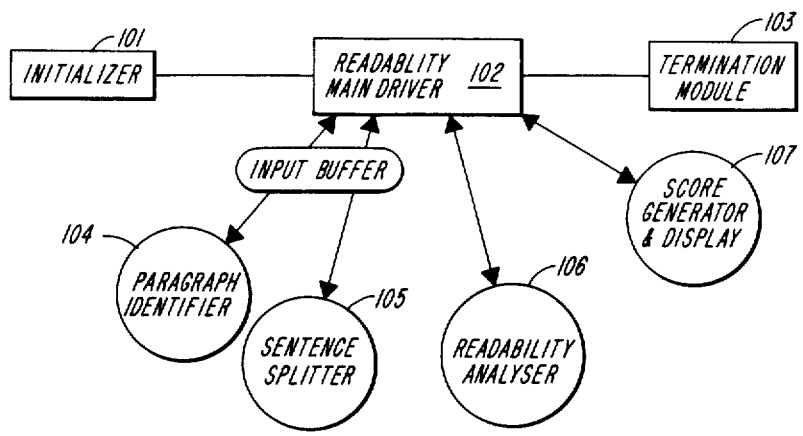
FIG. 3 is a block diagram of a preferred embodiment of the invention in a readability analyzer.

FIG. 3 shows a block diagram of operation of a preferred embodiment of a text editor of FIGS. 1 and 2 according to the present invention. The major operating sections in the preferred embodiment are software modules linked in a sequence so as to constitute an initializer 101 for a general purpose computer for text processing, a readability driver 102, and a termination module 103. The readability driver 102 controls a paragraph identifier 104, a sentence splitter 105, a readability analyzer 106, and a score generator and display 107.

The initializer 101 is a user-called routine which sets up the computer buffers for performing readability analysis. It loads a number of special database tables into RAM, as discussed below, to shorten or eliminate processing steps for certain words or constructions, to enhance the efficient and speedy operation of the analyzer. The initializer opens these databases and reads their corresponding hash tables into the machine memory for accessing during processing. It further sets a pointer for a sentence work space for receiving text data being processed, sets the work space to null, and initializes pointers in the input buffer.

It will be understood that the invention operates in connection with a computer system having word processing or text storage and manipulation capabilities. Accordingly, it will be assumed throughout this discussion that there is available in or received by the computer a block of digitally encoded text, e.g., ASCII-coded text. For purposes of manipulation and processing according to the preferred embodiment, the coded block of text lacks control codes, and includes only coded text material, such as alphabetic and numeric characters, punctuation marks, line feed, form feed, tab, single space, and carriage return codes. When utilized on a system in which the stored text includes control codes for signalling an output format to a printer, for example, it will be understood that extraneous control codes must be stripped from the text before further processing.

Continuing with FIG. 3, once initialized, the text processing system operates under the control of readability driver 102 to process text and develop a readability output. The driver 102 controls a paragraph identifier 104 and a sentence splitter 105 which operate independently, in a manner discussed more fully below, on coded text to determine paragraph and sentence boundaries. The driver also controls a readability analyzer 106 which operates on sentences of coded text to determine and tally fundamental measures, such as the syllable count of each word, useful for a readability output. In general, as each sentence is processed, the paragraph identifier, the sentence splitter, and the readability analyzer will be activated. Finally, a score generator and display module 107 computes certain readability scores as functions of the fundamental measures, and develops the readability output for display. A termination module then applies termination routines of a conventional type to de-allocate the table and memory workspace, thus preparing the analyzer for another cycle.

Figure 4:
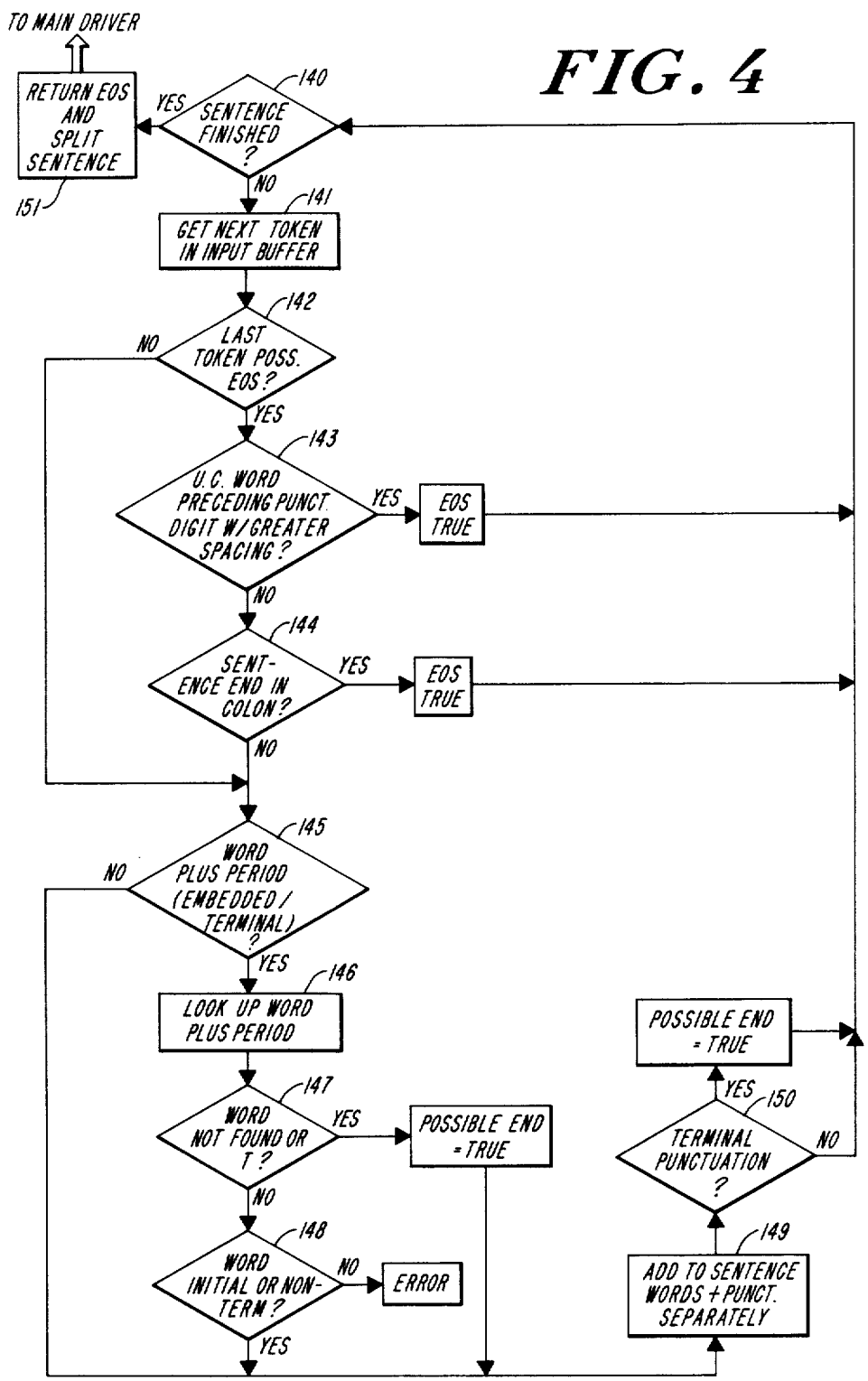
FIG. 4 is a more detailed flow diagram of the sentence splitter of the embodiment of FIG. 3.

Returning to FIG. 3, the basic operation of sentence splitter 105 is as follows. The sentence splitter fetches successive "tokens" from the input buffer, checks for a period at the end of the token, looks up possible abbreviations in a specially structured abbreviation table, and analyzes each possibly sentence-terminating word to ascertain an end-of-sentence boundary. FIG. 4 shows a more detailed flow chart for the operation of this section.

As shown in FIG. 4, the sentence splitter operates to successively fetch new tokens from the input buffer and subject them to processing operations. Each token is derived from a string of adjacent character codes between two consecutive occurrences of a white space code (a space, tab or carriage return) in the coded text from the input buffer.

The tokens are derived by tokenization processing denoted GET NEXT TOKEN 141 in FIG. 4, as follows. A continuous string of characters is fetched from the input buffer. Characters and punctuation are separated, if necessary, and their byte count positions listed in the buffer. Other variables are used to indicate a terminal apostrophe in the token, and other flags indicate if the token is preceded by a white space, or if it is an abbreviation. Tokens are split, according to the generally recognized rules outlined in the Chicago Manual of Style, into words and punctuation. As the token is processed in successive stages of the sentence splitter, it is either passed to the next processing stage, identified as an end-of-sentence (EOS) by an EOS signal, or identified as a possible end-of-sentence. When a token is identified as an EOS, processing stage 140 identifies a sentence boundary marker and calls the next token for further processing.

The preferred embodiment is implemented on a general purpose computer using the C programming language. This language permits the definition and manipulation of arrays and nested structures of a type well suited to the data requirements for this application. When the sentence splitter control successively fetches a new "token" from the input buffer, the coded text appearing between two successive white spaces is placed in a data structure serving as a template into which the following data items used in processing the token are inserted:

(i) an array of characters representing the punctuation following the token, (ii) an array of characters representing the actual token, (iii) an integer representing the word starting position in the buffer, (iv) an integer representing the punctuation starting position in the buffer, (v) an integer for a flag denoting appended apostrophe, (vi) an integer indicating presence of a token in a structure, (vii) an integer indicating the presence of punctuation after the token in a structure, (viii) an integer representing initial spaces, (ix) an integer representing preceding carriage returns, (x) an integer representing preceding tabs.

This data structure thus includes data necessary for the initiation or processing of the various units of the sentence splitter 105, which determines end of sentence boundaries.

Returning now to FIG. 4, in processing stage 142, if the last token was identified as a possible EOS, the new token is passed to stage 143; otherwise it is passed to stage 145. Stage 143 operates to confirm, when a preceding word was identified as a possible, but not definite, EOS, the status of the word. Stage 143 checks whether the new token is an uppercase word, has initial punctuation, or is a digit with greater than normal text spacing. Any of these characteristics confirms that the preceding word was an EOS, causing the EOS flag to be set to true and returned to stage 140. If none of these three conditions holds, a further check is performed at stage 144 for a colon, which the processor recognizes as an EOS. Because a colon will generally be followed in text by a list or irregular text fragment from which readability formulae or grammatical analysis would produce misleading results, the declaration of an EOS sentence boundary at a colon has been found to provide a useful identification for excluding such text fragments in the subsequent processing stages.

Tokens not recognized as EOS in stages 143, 144, and all tokens not following a possible EOS token, are passed to stage 145, which recognizes a word plus period string of coded text, including a text string having an embedded period. If no period is present, stage 149 adds the word and punctuation of the token separately to the current text sentence. Section 150 checks for the presence of terminal punctuation (period, exclamation point or question mark) and returns a possible EOS signal to stage 140.

Tokens having a word plus period combination are processed in stages 146–148 by a look up procedure which checks a word plus period against a table of abbreviations.

The abbreviation table contains approximately six hundred abbreviations which have been determined by statistical analysis of text material to be among the most commonly used abbreviations in the English language. Each abbreviation has an identifying field indicating whether the abbreviation is "terminating" (T), or is "non-terminating" (N). A non-terminating abbreviation is defined as one which never ends a sentence. For example, the abbreviations Prof., Mr., Ms. virtually always appear before a proper noun, and never end a sentence. During operation 146, if the word has fewer than eight characters, it is checked against the abbreviation table using a hash function or other indexing or look-up scheme. In stage 147, a determination is made. If the word is not found, or is a (T) abbreviation, the possible EOS flag is set and the token passes to stage 149. Otherwise, in stage 148, if the word is found in the table and is an N word, or if it is an initial, the token is passed to stage 149 and added to the current sentence without further processing.

In stage 150, all tokens ending in exclamation point (!) or question mark (?) are flagged as possible endings. When a token has been flagged as a possible ending, the process to find a definite EOS is repeated. Stage 142 operates to pass the next following token to stage 143 rather than stage 145, so as to inspect that token for indices confirming an end-of-sentence, as discussed above.

Stages 143, 144 confirm a possible EOS token, reset the byte position pointers, and re-initialize the sentence workspace pointers in the text processing buffer. Sentence splitter 105 then receives further tokens and determines further sentence boundaries until the text has been completely processed.

In a preferred embodiment, the text analyzer is configured to generate word count, syllable count, and sentence count for each sentence as it is processed; and paragraph statistics for the complete text.

In order to generate meaningful and consistent data, for shorter documents, while efficiently processing all text material in the input buffer, a preferred embodiment of the invention includes a text fragment identifier. The identifier includes a paragraph identifier 104 operative solely on white space code rather than alphanumeric code to identify and exclude text fragments.

Figure 5:
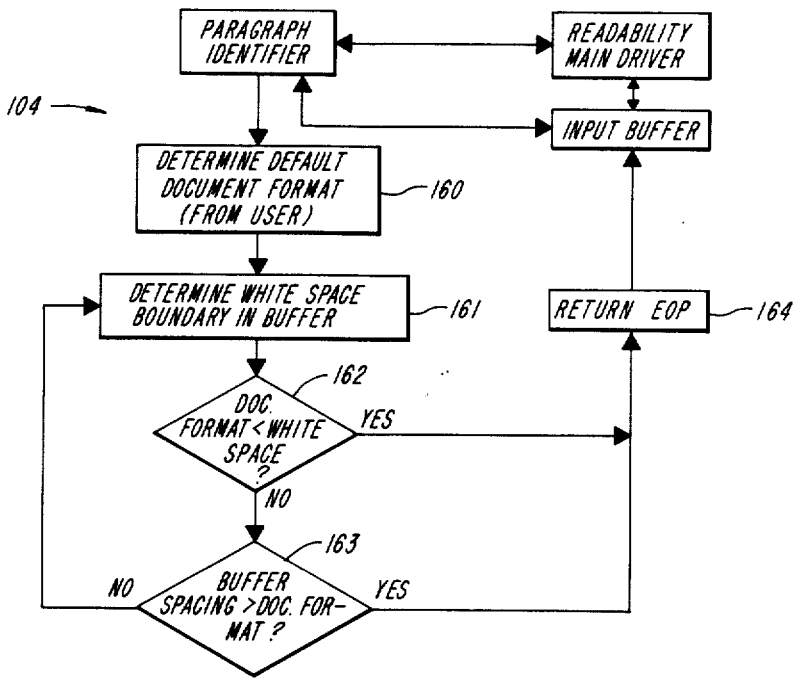
FIG. 5 is a flow diagram of the paragraph identifier of embodiment of FIG. 3.

FIG. 5 shows the detailed operation of this stage of the text analyzer. The paragraph identifier 104 includes a format stage 160 which receives an input, e.g., by keyboard data entry, indicating the document spacing, page margin and paragraph indentation. An input stage 161 receives successive occurrences of coded white space (space, tab, line feed, form feed, or carriage return codes) from the input buffer and subjects them to two processing steps 162, 163. Identifier 104 analyzes the occurrence of white space code before or after a block of coded text by applying two space comparison rules. First, at stage 162, if the white space preceding an occurrence of coded text is greater than the margin value and equal to the paragraph indentation, then the previous block of text is marked as a completed paragraph. Second, the occurrence of a spacing greater than the defined document spacing, for example three carriage returns in a double spaced document, identifies the previous block of text as a completed paragraph. If either of these conditions holds, stage 162 returns an end-of-paragraph (EOP) byte count 164 to identify a position in the input buffer of each end of a paragraph so determined. In stage 163, the end-of-paragraph (EOP) signal is also returned if the buffer spacing is greater than the document format. If the buffer spacing is less than the document format (i.e., if the input buffer did not include white space up to the next line) stage 161 is activated to get further code from the input buffer.

Because the paragraph identifier in this embodiment operates purely on white space codes, rather than punctuation, it returns an EOP count after certain text fragments, such as at the transition between a header or salutation and text, as well as at an end of paragraph.

A preferred embodiment of a text analyzer includes a white-space paragraph identifier as just described, and a word-based sentence splitter as described above. During processing, a comparator compares the end of paragraph (EOP) byte count returned by the paragraph identifier with the end of sentence (EOS) byte count returned by the sentence splitter.

When a paragraph ends before a sentence, a result corresponding to the absence of terminal punctuation at the end of a paragraph, the coded text of that paragraph is identified as extraneous text fragment. When used in a system to develop word and syllable count data for a readability analysis output, such a prematurely terminated "paragraph" is recognized as a fragment and the word and syllable count data are not collected for that fragment. The analyzer proceeds to the next portion of text, taking the first occurrence of text following the "paragraph" as the first token of a new sentence.

Correspondingly, if the EOS byte count equals the EOP byte count, the byte count position is both an end of sentence and an end of paragraph. Finally, if the EOS byte count is less than the EOP byte count, only an end of sentence is indicated. These latter two byte count flags signal actual paragraph and sentence boundaries.

The preferred embodiment thus uses a sentence splitter 105 operative on coded text and an independent paragraph splitter 104 operative solely on white space codes to determine boundaries of substantive text material and to identify the boundary of isolated text fragments. In the preferred embodiment, a readability analyzer then operates only on substantive text material. This results in uniform measures of text statistics. For example, in a letter addressed to a person with a polysyllabic name and a six line address, or having a postscript indicating that copies were sent to multiple persons on a distribution list, these fragments will not be analyzed. For processing longer documents, e.g., novels or magazine articles, in which text fragments form a negligible portion of the document, the white space paragraph identifier may be omitted.

In a further aspect of the invention illustrated in FIG. 3, the text analyzer operates on the identified text material as a readability analyzer 106.

The readability analyzer 106 analyzes "legal sentences", i.e., text material not identified as a fragment by the above discussed EOP/EOS criteria, to derive basic measures of the text. Certain of the measures are straightforward and have previously been implemented on commercially available systems so as to require no further discussion. For example, the determination of the number of words in a sentence, or the average word length in letters may be readily effected. Analyzer 106 also includes a new syllable counter for generating the syllable count of each word. Each word is processed by looking it up in a table, and, if the word is not found, performing certain substitutions for characters in the word to place it in a form for counting its syllables. The syllable counts and other generated statistics are then analyzed at stage 107 to generate a readability output for the body of text.

Figures 6, 7:
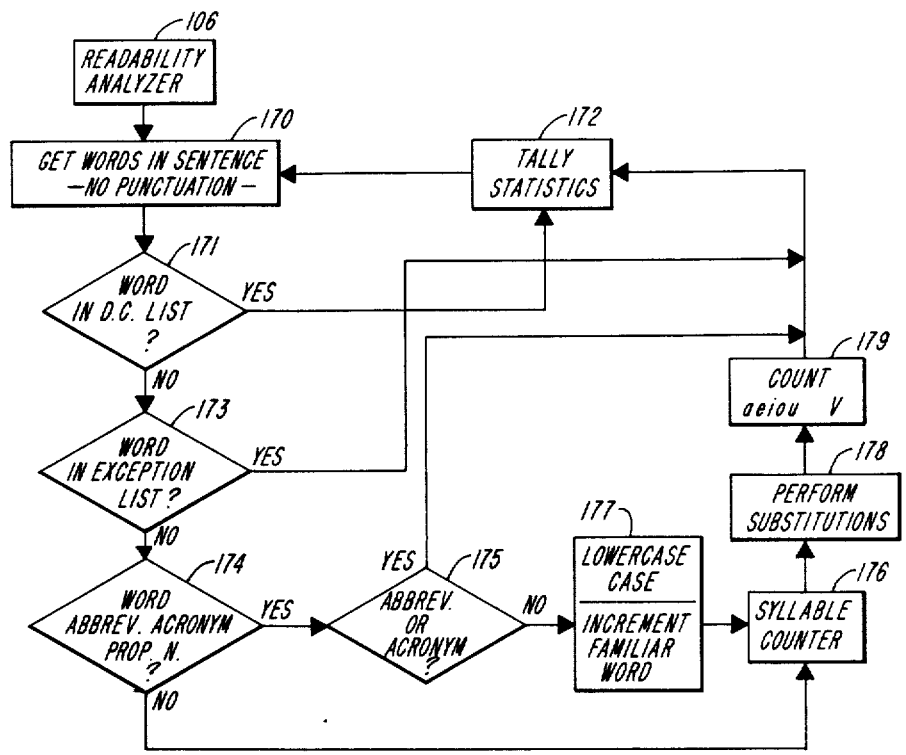
FIG. 6 is a flow diagram of the readability analyzer of the embodiment of FIG. 3.
FIG. 7 is a table showing readability outputs of the analyzer and the data developed for each output.

FIG. 6 shows a detailed flow chart of the syllable counter portion of the invention.

The syllable counter performs two basic operations on sequential tokens to determine the syllable count of each word. The first operation includes looking up the word in a table of common words, each entry of the table having an empirical syllable-count filed. The second operation, performed on words not in the table, involves substituting characters in the word and counting certain characters of the substituted word to derive a syllable count. Both these aspects of the device are believed to be new.

The table is a modified Dale-Chall list of the words which have been determined on a statistical basis to be the most frequently used words in the English language. Several modifications to the table have been made. The original Dale-Chall list, intended for hand scoring by a human grader, included approximately 3,000 base words. A person evaluating text using the list would recognize the occurrence of an inflection of the base word as a common, i.e., listed word. For example, the occurrence of "worked", "working", "works" (as a verb) or "works" (as a plural noun) would all be considered occurrences of the Dale-Chall entry "work." The modified list used in the preferred text analyzer is compiled by checking each of the inflections of a base word of the original Dale-Chall list against a statistically validated database of English text, the Brown Corpus. Only those inflections which occur with a frequency greater than a threshhold frequency are included in the modified list as separate entries. In addition, each entry in the modified list includes, as a field thereof, the syllable count of the entry. Further, where applicable to the particular word, a flag is preferably included indicating whether the word is an exception to a particular syllable count rule. As an example, a word terminating in s, when followed by 's will normally gain one syllable. The modified Dale-Chall list preferably includes a flag indicating that this rule applies, i.e. that the syllable count of the entry followed by "'s" increases by one syllable. For clarity of discussion below, however it will be assumed that the syllable count exception words are on separate list, called the exception list, rather than identified by a special flag in the modified Dale-Chall list.

The operation of the readability analyzer proceeds as follows. Each word is stripped of punctuation in stage 170 and is looked up in the Dale-Chall list in a look-up operation 171. If the word is in the Dale-Chall list its syllable count is returned and a counter 172 tallies the syllable count data. If not, a check 173 determines if the word is in the exception list. If so, the exception syllable count is returned and tallied. The syllable counting operation for most words in a text will stop at this first stage, with the return of the syllable count for the word.

In connection with the first operation above, it will be appreciated that the Dale-Chall base form list includes over three thousand words, and is a relatively large database. The modified list has approximately seven thousand entries. Accordingly, this table is preferably subject to compression by a statistical coding technique so as to occupy approximately 30 to 50% less space than required by the raw ASCII code. Preferably, the Dale-Chall table is provided, e.g., on a disc storage medium, and a text analyzer operates by loading hash tables into the computer RAM for accessing the Dale-Chall table, thereby permitting efficient and quick look-up of the words being processed.

For the remaining words, a syllable counter 176 performs an ordered sequence of substitutions 178 of certain letters and symbols for the occurrence of other letters and symbols, when occurring in a particular context in the text, to produce modified text words. Finally, a counter 179 counts occurrences of the vowels and certain symbols in the substituted word to yield the syllable count of the original word. The syllable counter thus provides the syllable count data for readability analysis discussed further below.

First, however, words not found in the Dale-Chall or exception lists are checked at stage 174 to identify abbreviations, acronyms, and proper nouns for special processing.

First, if the word was flagged as an abbreviation, i.e., was found in the abbreviation table by the sentence splitter, then a special syllable counter 175 performs the following syllable-counting operations:

1. Each vowel, if any, counts as a syllable.
2. If there are no vowels, each capital letter counts as a syllable.
3. Otherwise, syllable count is set to one.

Acronyms are identified at stage 175 as consisting of one of the following:

1. a single upper case letter,
2. two characters followed by an inflection ('s), or
3. all upper case letters.

The special syllable count operation for abbreviations is also applied to acronyms.

Proper nouns are identified at stage 174 as tokens having an initial upper case letter, followed by a lower case letter. A proper noun is simply, at stage 177, converted to all lower case letters and processed by the syllable counter 176 as a normal word using the substitution stage 178.

The proper nouns and words which are neither abbreviations nor acronyms are then passed to syllable counter 176.

In the second operation 176–179, the targeted substitution of particular letters and combinations proceeds as follows. First, a block of text preceding or following a hyphen is split off as a separate word. All text material is placed in lowercase form. Special uppercase dummy symbols, (V), used to represent a sounded vowel-like element, (E) used to represent an unsounded element, and (H) are substituted during processing. Substitutions are performed to result in a modified word in which each occurrence of a, e, i, o, u or V corresponds to one syllable. The substitution rules serve to restructure the word so that certain specific characters each correspond to one syllable, and so that extra vowels which would otherwise be counted are eliminated. In the preferred embodiment described herein, the major substitution rules are crucially ordered. Subrules within the major rules may be performed in a flexible order. The substitution rules are as follows, in eight groups I–VIII.

I. A block of text preceding an apostrophe is split off as a separate word.

qu is rewritten as q everywhere.
gu is written as g when it precedes a, e, or i.
sh is rewritten as H.
ch is rewritten as H.

In each case, the H is chosen as a distinct code letter not otherwise appearing in the lower case alphabet used, to represent the phonemes which it replaces.

II. If the word does not contain "" and the word contains only one vowel or vowel combination from among the following set (a, e, i, o, u, y, ea, ee, ei, eu, ie, oa, oo, ou) then the word has only one syllable. In this case the syllable counter delivers an output signal 1 and proceeds to process the next word. Otherwise, the syllable counter continues with the following substitutions.

For the subsequent targeted substitutions, the symbol C stands for any consonant including H (as substituted above).

III. The letter y is rewritten as V if preceded by any C.

IV. At the end of a word, e is rewritten as V if preceded by Cl. This substitution covers words such as cradle, or eagle.

At the end of a word es is rewritten as Vs if preceded by any of the set, (Cl, c, g, s, x, z, H). Representative words are pickles, faces, pages, kisses, boxes, buzzes, watches.

The combination ed at the end of a word is rewritten Vd if preceded by any of the set (Cl, d, t).

The combination e's is rewritten V's if preceded by any of the set (Cl, c, g, s, x, z, H).

The combination 's is rewritten as Vs if preceded by any of the set (s, x, z, H).

The letter e is rewritten as E if it is a final letter, or is followed by 's or a final d or s. The symbol E is used herein as a substituted character to indicate a vowel which will not be voiced as a separate syllable.

The combination lVd at the end of a word is rewritten as lEd only if it follows one of the set (r, 1, w). Examples are whirled, snarled, pulled, bowled, crawled.

V. The combination iou is rewritten as V only if it follows one of the set (c, g, n, t, x). Examples are vicious, religious, ingenious, nutritious, and obnoxious. Otherwise, if the combination iou does not follow one of the five listed consonants, it is rewritten as VV. Examples are invidious, pious, vicarious, abstemious and impervious.

The combination eou is rewritten as V only if it follows c or g, as in herbaceous or outrageous. Otherwise, eou is rewritten as VV.

The combination eau is rewritten as V.

The combination uou is rewritten as VV. Examples are contiguous, deciduous, virtuous.

VI. After the foregoing substitutions have been made, vowel pairs are substituted. Thus, the following combinations: aa, ae, ai, au, ou, uu are always rewritten as V. (These substitutions reflect American rather than British pronunciation).

The combination ea is rewritten as V unless it occurs in one of the following combinations +r___CC (where + indicates the initiation of a new word)
r___l
+pr___CC
cr___t
+id___
th___

Corresponding examples for the six patterns noted above, are react or reassure (1); realign, cereal (2); preamble, prearrange (3); creation, creator (4); idea, ideation (5); and theatre, theatrical (6).

The double vowel ee is rewritten V unless it follows an initial r or initial pr, as in reelect or preeminent.

The combination ei is rewritten V unless it follows an initial d, r, or pr. Examples are deify, reimburse, preignition.

The combination eo is rewritten as V only if occurring between g and n, or h and n, as in dungeon, surgeon, luncheon, truncheon.

The combination eu is rewritten as V unless it occurs immediately after an s, or an initial r. Examples are museum, colosseum, reupholster, reunite.

The combination ia is rewritten as V only if it terminates a word immediately after c, s, or t as in acacia, amnesia, militia, or if it occurs between one of the following of two consonants:

c___l
c___n
l___n
l___r
s___n
t___l or
t___n

Examples are official, mathematician, carnelian, familiar, controversial, Asian, partial, Martian.

The combination ie is rewritten V if occurring between the consonant pairs c___n; n___n; or t___n. Examples are efficient, convenience, patient.

The combination ie is rewritten as V unless it follows the letter b, or it precedes a terminal r, a terminal st, or a t, nc, or nt. Examples of words illustrative of this substitution in the order cited, are biennial, hungrier, happiest, quietly, audience and ambient.

The combination io is rewritten as V only if occurring between one of the following consonant pairs:

g___n
l___n
n___n
n___r
s___n
t___n and
H___n

Examples are religion, million, onion, junior, mansion, potion, and cushion.

The combination oa is rewritten as V unless it occurs between the consonant pairs c___g or c___l, as in coagulating or coalition.

The combination oe is rewritten as V unless it follows initial p or initial c, as in poetry or coeval.

The combination oi is rewritten as V unless it precedes nc, ng, ca, cs, or a terminal c. Examples are coincide, going, heroically, stoics and stoic.

The combination oo is rewritten as V unless it occurs in one of the following two combinations: +c___p or +c___r (where + indicates the initiation of a word). Examples are cooperate, coordination.

The combination ua is rewritten as V only if it occurs between an s and one of the letters d, s, g, or v. Examples are persuade, persuasion, assuage, and suave.

The combination ue is rewritten as V unless it precedes n, t, l, terminal r, or terminal st. Examples are innuendo, duet, duel, truer, or truest.

The combination ui is rewritten as V only if it occurs in one of the following combinations:

b___l
j___
sl___
s___t
c___t or
Cr___

Examples are build, juice, sluice, suit, circuit, fruit.

VII. An occurrence of e is rewritten as E if it follows som_, ther_ or for_, or if it occurs between C and one of the following set: (ment, ly, ness, less, or full). Examples are something, thereby, forehead, requirement, scarcely, awareness, hopeless, hopeful. This modification assures a silent e before certain suffixes.

VIII. The character ' is rewritten V only if occurring in one of the following combinations: Cn_t, C_v, or C_l. Examples are wouldn't or hasn't; should've; and it'll or that'll. Again, these contractions are representative of American, not British, usage.

After the foregoing eight groups of targeted substitutions have been made, the syllable counter, using a simple character recognition unit, counts each occurrence of a, e, i, o, u or V as one syllable.

It has been found that the foregoing processor determines a substantially correct syllable count. As noted above, the first operation of the syllable counter, returning an empirically derived syllable count listed as a field of each word in the Dale-Chall list, is applied to a substantial proportion of all words in the text. Accordingly, the syllable counter applies the targeted substitution operations listed above to a relatively small number of text words, normally about 15% of average text.

Once the text has been split into sentences and the syllable count of each word tallied or added to the text file, a readability analyzer section of the text analyzer collects the accumulated word, letter, syllable and other numerical count data, computes certain functions of the numerical data, and delivers a number of readability scores. In the presently preferred embodiment, these scores are the ARI readability score, FOG index, Kincaid, Bormuth, Dale-Chall, Flesch, and Coleman-Liau readability scores. The data required for the numerical calculation of each readability score appears in a table as FIG. 7.

It will be observed that the computation of each score requires simple arithmetic manipulation of numerical data derived during the preceding processing steps. Thus, for example, a score may be a linear combination of average sentence length, average syllable count per word, proportion of words not in the Dale-Chall list or similar quantities. The readability analyzer thus requires only elementary arithmetic units to tally the required statistics and compute its output data. The readability analyzer preferably also develops an output listing, for the entire text or for each paragraph, the number of sentences of each length, number of short sentences, number of long sentences, number of sentences ending in a question mark, and number of sentences ending in an exclamation point. This data has been found to be useful for evaluating text.

Each formula except for the Bormuth Degrees of Reading Power, represents a grade level score. The Bormuth formula yields a proportion: the larger the value, the easier the prose. For ease of comparison with the other, grade-level, scores, this value is converted to an ascending score by taking its reciprocal and scaling. This scaled Bormuth score is correlated to the type of writing characteristic of the score range. The readability analyzer according to a preferred embodiment of the present invention stores a number of message labels, and also stores a number of brief textual commentaries indexed to these labels, for each Bormuth score range. When the Bormuth score is displayed, a text message indicating the type of text material for which such score is suitable is displayed. For example, a Bormuth score of "48" is displayed with the message:

"Child Magazines/Fiction"

whereas a Bormuth score of "77" is displayed with the message:

"Professional Journals/Experimental."

Other messages are displayed with other scores. When the scaled score does not correspond precisely to an established Bormuth value, a range of text types are identified from the next higher and next lower established score values.

In addition, messages may be displayed with the other types of readability outputs. For example, certain readability scores are considered accurate indicators for particular grades. The Dale-Chall formula may be appropriate for grades four to twelve, whereas the Flesch Reading Ease formula is generally most accurate for secondary school materials. Instructive messages indicating these preferred areas of application for particular scores may, in additional embodiments of the invention, be displayed together with the score results to aid the user.

The foregoing discussion describes the overall operation of a readability analyzer which is a presently preferred embodiment of aspects of the invention.

Computation of the Bormuth and Dale-Chall readability scores requires tallying the number of familiar words in the text. For this computation, a familiar word is taken to be one which occurs in the Dale-Chall table, or is a proper noun, acronym or abbreviation. A familiar word flag is set during processing as the processor determines the word is in one of the above classes, and the readability analyzer 106 counts the flags in a familiar word counter when it collects text statistics.

The foregoing description of the illustrated text analyzer is by way of description and not limitation, and it is understood that different aspects of the invention may find expression in other devices. The sentence splitter, while described in connection with a readability analyzer, may operate in a grammar correction processor for checking grammar, style and punctuation of coded text. Other types of text analyzers utilizing one or more processing units according to different aspects of the invention will occur to those skilled in the art, and all such embodiments are intended to be within the scope of the invention, as defined by the following claims.

What is claimed is:

1. An electronic system for the analysis of digitally encoded text, such text including sequential strings of characters separated by spaces, such system comprising
 buffer means for receiving and storing coded text,
 means for examining each successive character sequence of the text to determine word and punctuation portions thereof and identify each character sequence having a terminal period,
 abbreviation table means for storing a table of common abbreviations with an indication if an abbreviation is of a non-terminating type,
 look-up means for checking a character sequence having a terminal period against the abbreviation table and determining its type, and sentence boundary determining means in communication with the look-up means and operative on successive character sequences for determining whether a sentence boundary occurs at an occurrence of a terminal period and wherein a discrimination means identifies and diverts from the sentence boundary determining means said non-terminating abbreviations.

2. A system according to claim 1, further including paragraph boundary determining means operative solely on white-space code, for determining a paragraph boundary of the text.

3. A system according to claim 2, further including comparator means responsive to the paragraph means and to the sentence boundary determining means, for identifying as a text fragment a block of coded text having a paragraph boundary preceding a sentence boundary.

4. A system according to claim 3, further including means for generating counts of basic text units from the coded text excluding text fragments, and for developing a readability output representative thereof.

5. A system according to claim 4, further including word table means, for storing a Dale-Chall table of common words together with an indication of the syllable count of a word, and wherein the counts of basic text units include at least one of word length in syllables and occurrences of familiar words in the text.

6. A system according to claim 5, further including means for displaying an interpretive message with the readability output.

7. A system according to claim 6, wherein the readability output includes a linear function of plural basic text units.

8. A system according to claim 7, wherein a readability output includes a Bormuth Reading Power Score.

9. A system according to claim 1, further including means for generating counts of basic text units from coded text and for developing a readability output representative thereof.

10. A system according to claim 9, further including word table means, for storing a Dale-Chall table of common words together with an indication of the syllable count of a word, and wherein the basic text units include at least one of word length in syllables and occurrences of familiar words in the text.

11. A system according to claim 10, further including means for displaying an interpretive message with the readability output.

12. A system according to claim 11 wherein the readability output includes a linear function of plural basic text units.

13. A system according to claim 11, wherein a readability output includes a Bormuth Reading Power Score.

14. A system for the analysis of digitally encoded text including sequential strings of characters separated by white space, such system comprising
 means for receiving and storing digitally encoded text
 word table means for storing a table of common words together with a syllable count indication for a stored word
 word identifier means for examining successive strings of coded text and identifying each word therein, and
 syllable counter means for determining the syllable count of each identified word, wherein the syllable counter means includes means for checking an identified word against the word table and returning, for a word stored therein, the syllable count indication.

15. A system according to claim 14, wherein the syllable counter means further includes
 means for performing an ordered sequence of context-dependent substitutions of coded characters in an identified word to determine a modified word, and
 means for counting occurrences of a discrete number of coded characters in the modified word to obtain the said syllable count.

16. A system according to claim 15, further including readability means for measuring the readability of the digitally encoded text material.

17. A system according to claim 16, wherein a syllable count indication for a word in the table includes an indication that the word is an exception to a context-dependent substitution.

18. A system according to claim 17, further including means operative on the digitally encoded text for separating text body from text fragments, and wherein the readability means measures the readability of the text body.

19. A system according to claim 16, further including sentence splitter means for determining sentence boundaries in the text information, and wherein the readability means includes means for measuring sentence data including at least one of sentence length in words, and number of sentences per paragraph.

20. A system according to claim 16, further including means for displaying an output indicative of the measured readability.

21. A system according to claim 20, wherein the output indicative of measured readability includes an interpretive message.

22. A method for analyzing digitally encoded text, such text including sequential strings of characters separated by spaces, the method comprising the steps of:
 receiving and storing coded text,
 storing a table of abbreviations together with an indication of non-terminating abbreviations,
 examining in sequence character strings of the text to recognize a string including a period, checking a recognized character string against the abbreviation table to identify non-terminating abbreviations, operating on successive character strings not so identified to determine a sentence boundary, identifying successive white space codes in the text, and comparing the identified codes to a nominal document spacing to determine paragraph boundaries of the text.

23. A method according to claim 22 further including the step of identifying as a text fragment text having a paragraph boundary as determined by said comparing step occurring before a sentence boundary as determined by said operating step.

24. A method according to claim 23, further including the steps of generating measures of the text between sentence boundaries, and developing a readability output as a function of the generated measures.

25. A method of claim 24, further including the step of storing a table of common words together with an indication of the syllable count of a word, and wherein a measure of the text includes at least one of word length in syllables and a measure of familiar words occurring in the text.

26. A method according to claim 25, further including the step of displaying an interpretive message with the readability output.

27. A method according to claim 26, wherein the readability output includes a linear function of at least one of the measures.

28. A method according to claim 26, wherein a readability output includes a Bormuth reading power score.

29. A method according to claim 22, further including the steps of generating measures of the text between sentence boundaries, and developing a readability output as a function of the generated measures.

30. A method of claim 29, further including the step of storing a table of common words together with an indication of the syllable count of a word, and wherein a measure of the text includes at least one of word length in syllables and a measure of familiar words occurring in the text.

31. A method according to claim 30, further including the step of displaying an interpretive message with the readability output.

32. A method according to claim 31, wherein the readability output includes a linear function of at least one of the measures.

33. A method according to claim 31, wherein a readability output includes a Bormuth reading power score.

34. A method for analyzing digitally encoded text including sequential strings of characters separated by white space, the method comprising the steps of receiving and storing digitally encoded text storing a table of words together with a syllable count indication for a stored word examining successive strings of coded text and identifying each word therein, and checking an identified word against the table to determine its syllable count indication thereby determining the syllable count of the identified word.

35. A method according to claim 34, further including the steps of performing an ordered sequence of context-dependent substitutions of coded characters in the identified word to determine a modified word, and counting occurrences of specific coded characters in the modified word to obtain a syllable count of the identified word.

36. A method according to claim 35, further including the step of computing a function of the syllable count of words in the text to determine the readability of the digitally encode material.

37. A method according to claim 36, wherein a syllable count indication for a word in the table includes an indication of a context-dependent substitution applicable to the word.

38. A method according to claim 36, further including the steps of distinguishing a text fragment from text body, and wherein the step of computing a function includes computing such function of the syllable count of the words in the text body.

39. A method according to claim 36, further including the steps of determining sentence boundaries in the coded text, and determining the readability as a function of sentence data, such data including at least one of sentence length in words, and number of sentences per paragraph.

40. A method according to claim 36, further including the step of displaying an output indicative of the readability.

41. A method according to claim 40, wherein the step of displaying includes displaying an interpretive message.

42. An electronic system for the analysis of digitally encoded text, such encoded text including white-space code and character code, such system comprising sentence splitting means operating on successive strings of encoded text for determining sentence boundaries of the text paragraph identifier means operative solely on white-space code of the text for determining paragraph boundaries text fragment identifier means for identifying text fragments by comparing the sentence boundaries and the paragraph boundaries, and identifying as a text fragment text having a paragraph boundary preceding a sentence boundary.

* * * * *

UNITED STATES PATENT AND TRADEMARK OFFICE
CERTIFICATE OF CORRECTION

PATENT NO. : 4,773,009

DATED : September 20, 1988

INVENTOR(S) : Henry Kucera, et al.

It is certified that error appears in the above-identified patent and that said Letters Patent is hereby corrected as shown below:

Column 12, line 44, after "l̲ ̲r" add new line --s̲ ̲l--.

Signed and Sealed this

Eighth Day of May, 1990

Attest:

*Attesting Officer*

HARRY F. MANBECK, JR.

*Commissioner of Patents and Trademarks*